June 15, 1937.   F. C. SINEX   2,083,927
FISHING REEL
Filed June 15, 1935
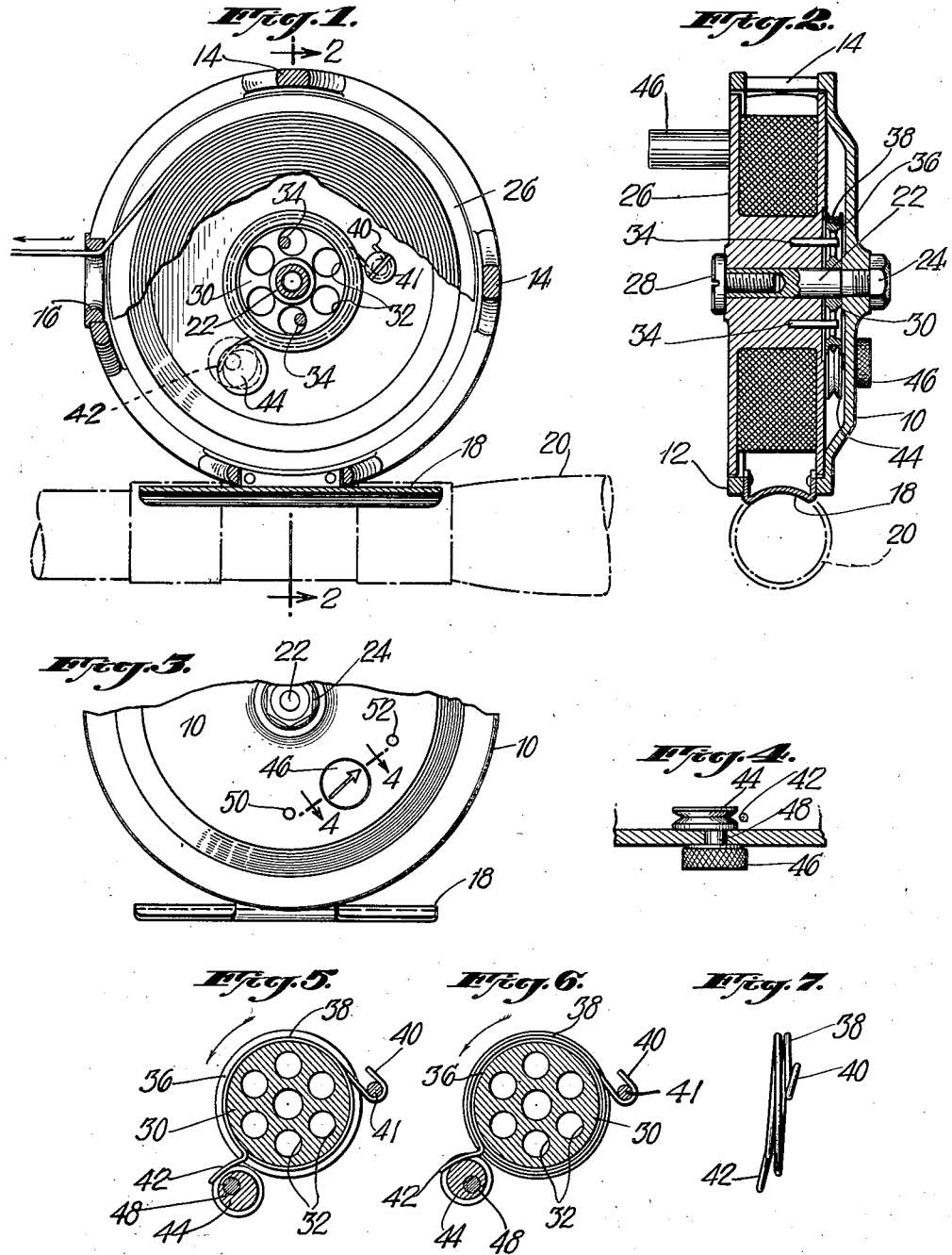
INVENTOR.
FOSTER C. SINEX.
BY
ATTORNEYS Patented June 15, 1937

2,083,927

UNITED STATES PATENT OFFICE 2,083,927

FISHING REEL

Foster C. Sinex, Hazleton, Pa.

Application June 15, 1935, Serial No. 26,707

3 Claims. (Cl. 242—84.5)

This invention relates to fishing reels and aims to provide improved means for applying a braking action, when the spool of the reel is rapidly turned in a direction to pay off the line.

It is well known to fishermen that considerable annoyance can be caused by snarling or so-called back-lash in the line when the spool of the reel is rotated at a speed greater than that required to pay off an amount of line, which should normally be paid off during each revolution. Such snarling or back-lash frequently occurs either when casting or when the fish makes a strike and rapidly darts off with the lure. Many attempts have been made to provide means for preventing back-lash or snarling. Some involve complex and expensive brakes, many of which are open to the objection that after use for a limited time, due to wear of the parts, they become unreliable in their action.

The reel of my invention aims to overcome the shortcomings of reels heretofore used, yet to provide a simple and inexpensive brake which will continue to operate satisfactorily for a long period of time and whose action will not be materially lessened even after considerable wear of the parts has taken place.

The invention is applicable either to reels having spools actuated through gearing or to reels in which the spool is directly driven. By way of illustration, I have shown the invention applied to a spool of a directly driven fly rod reel. In the embodiment of the invention illustrated, Fig. 1 is a longitudinal section through a fly rod reel showing the improved braking means; Fig. 2 is a section on line 2—2 of Fig. 1; Fig. 3 is a fragmentary side elevation illustrating means for adjusting the braking action; Fig. 4 is a detail section on line 4—4 of Fig. 3; Fig. 5 is a detail view of the brake drum, the spring member and means for varying the magnitude of friction grip, the parts being shown in the position to apply the maximum braking action; Fig. 6 is a view similar to Fig. 5, but showing a spring gripping member in a different position of adjustment; Fig. 7 is a detail end view of the spring member shown in Figs. 5 and 6.

Referring in detail to the drawing, 10 represents the side wall of a frame member. Supported by and spaced from this member, there is a rim portion 12, the latter being carried by a plurality of cross pieces 14, a line guide 16 and a rod engaging member 18. The member 18 is adapted to be secured by any conventional fastening means to the fishing rod 20.

The frame member, as illustrated, is circular and secured to the center thereof and extending axially there is a shouldered spindle 22 fastened by a nut 24. The spool 26 of the reel is rotatably mounted on the spindle and is held against endwise motion by a removable screw 28.

Also rotatably mounted on the spindle, there is a brake drum 30. This member is provided with a plurality of circularly spaced openings 32, any opposite pair of which are adapted to coact with pins 34 carried by the spool.

The brake drum 30 is provided with a peripheral groove 36, which is adapted to be occupied by a fraction of or one or more convolutions of a spring braking element. The spring braking element, as illustrated indicated generally by numeral 38, includes a hooked portion 40 which is adapted to be anchored to the frame member, for example by means of a screw 41. One or more convolutions of this spring member are wrapped around the brake 30 within the confines of the groove 36. At its free end, the spring has an outwardly extending portion 42, which is arranged to coact with a wedge, screw, cam, or eccentric member 44, which is operable by a knurled thumb piece 46. While the extension 42 illustrated extends approximately radially it could be formed as a tangential extension, if desired.

As illustrated, the thumb piece 46 has extending axially therefrom a journal portion 48 which is eccentric to the member 44. Thus, when the thumb piece is turned, the member 44 is capable of moving the free end 42 of the spring from the position of Fig. 5 to the position of Fig. 6, or to different intermediate positions so as to vary the magnitude of the friction grip, exerted by the spring on the brake drum.

When the parts are adjusted, as shown in Fig. 5, the convolutions of the spring make it fairly snug around the entire periphery of the brake drum. And when a line is drawn off from the position indicated in Fig. 1 the reel will be turned counter-clockwise, as indicated by the arrow in Fig. 5. Such counter-clockwise motion will, with the parts assembled, as shown in Fig. 5, tend to wrap the spring more tightly on the drum and thus produce the maximum friction grip. When the reel is turned clockwise, by means of a suitable knob 46 secured to the reel, the braking action will be released, it being appreciated that such clockwise rotation will tend to unwrap the spring and thus the spring will readily slip relatively to the brake drum. By manipulating the thumb piece 46, it is apparent that the initial magnitude of the gripping action of the spring on the brake drum can be readily varied.

The turning movement of the thumb piece will bring about such a coaction between the extension 42 of the spring and the member 44 as to cause a slight rocking of the spring about the anchorage screw 41. This will somewhat vary the arc of actual contact between that part of the convolution or convolutions on one side of the periphery of the brake drum. In short, such rocking caused by manipulation of the member 44 will move the spring as a whole to a position slightly eccentric to the periphery of the drum. Clearly, therefore, the extent of movement effected by the turning of the member 44 will materially affect the spring grip exerted thereon. As the throw of the eccentric or cam member varies with the turning movement, it follows that a range of adjustment within all practical requirements is thus effectively secured. And regardless of the position of adjustment of the member 44, the braking action will tend to restrain the movement when the spool is turned in a direction to pay off the line and that the braking action will be lessened when the spool is rotated in a direction to wind up the line.

The thumb piece 46, as shown in Fig. 3, has an arrow marked thereon. And there are two differently colored spots 50 and 52 marked on the casing, the spot 50, for example, being green and 52 being red. When the arrow is pointed toward the red spot 52, it is an indication that the spring is in the condition illustrated in Fig. 5 to apply the maximum braking action and when the arrow is turned toward the green spot 50, it indicates that a lesser braking action will be exerted and when arrow point registers with the green spot 50 the spool is fully released.

The adjustment effected by the cam or eccentric 44 enables the user of the reel to vary the friction grip or braking action of the spring to suit his needs. And after either the spring or the drum become worn down by long use such wear can be compensated for by manipulation of the member 44, or by releasing end 40 and moving spring circumferentially to take end 42 farther away from cam.

The position of the member 44 is maintained by reason of the friction between it and the surface of the casing 10 and the friction between the thumb piece 46 and said casing. The member 44 makes a drive fit on the journal 48 and when the parts become loose or worn after long use the desired tightness can be restored by merely striking a light blow on the end of the member 44 while holding the thumb piece 46 on a fixed support.

The spring and brake drum of my invention are well suited to serve as a replacement in old reels for the conventional ratchet and pawl click after the latter have become badly worn or ineffective.

While I have described quite precisely certain details of the construction and arrangement of the parts in the embodiment of the invention illustrated it is not to be construed that I am limited thereto since various modifications may be made by those skilled in the art without departure from the invention as defined in the appended claims.

What I claim is:

1. A fishing reel comprising a rotatably mounted spool for the line and means effective to restrict the rotation of the spool including a rotatable brake element operatively connected with the spool and a spring anchored at one end and having a portion encircling said brake element and effective to exert a friction grip thereon when the spool turns in the direction to pay off the line and to release such grip when the spool is turned in the opposite direction to reel in the line and including means for varying the magnitude of the friction grip exerted by said spring.

2. A fishing reel comprising a rotatably mounted spool for the line and means effective to restrict the rotation of the spool including a rotatable brake element operatively connected with the spool and a spring anchored at one end and having a portion encircling said brake element and effective to exert a friction grip thereon when the spool turns in the direction to pay off the line and to release such grip when the spool is turned in the opposite direction to reel in the line and including an extension on said spring and a manually adjustable member coacting therewith for varying the magnitude of the friction grip exerted by said spring.

3. A fishing reel comprising a rotatably mounted spool for the line and means effective to restrict the rotation of the spool including a rotatable brake element operatively connected with the spool and a spring anchored at one end and having a portion encircling said brake element and effective to exert a friction grip thereon when the spool turns in the direction to pay off the line and to release such grip when the spool is turned in the opposite direction to reel in the line, said spring having an extension on the free end thereof and an adjustable member engaging the extension for varying the magnitude of grip exerted by said spring.

FOSTER C. SINEX.